United States Patent Office 2,953,165
Patented Sept. 20, 1960

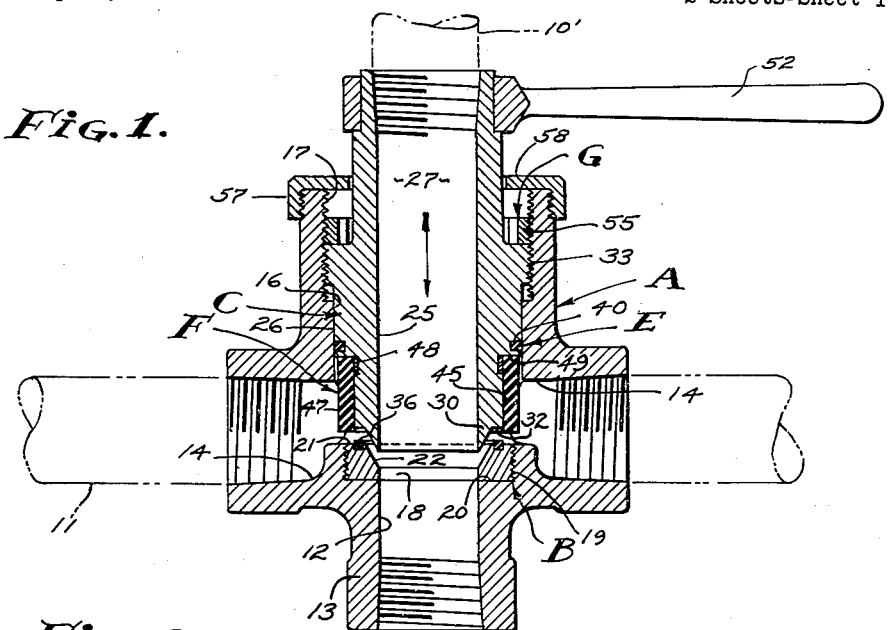
Sept. 20, 1960 — C. B. REYNOLDS — 2,953,165
MULTI-PURPOSE SYPHONING VALVE
Filed May 16, 1957 — 2 Sheets-Sheet 1
INVENTOR.
CHARLES B. REYNOLDS
BY
W. H. Maxwell
AGENT

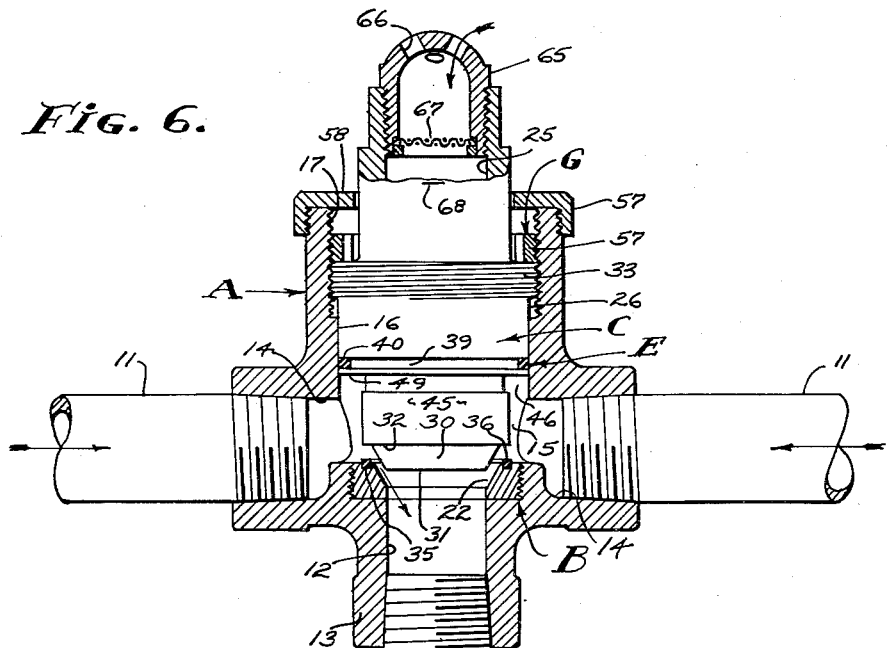

2,953,165

MULTI-PURPOSE SYPHONING VALVE

Charles B. Reynolds, P.O. Box 619, Orange, Calif.

Filed May 16, 1957, Ser. No. 659,704

4 Claims. (Cl. 137—625.4)

This invention relates to a valve and in particular is concerned with a multi-purpose valve that may be selectively used as a hydrant valve, and as a throttling valve, and as a syphoning valve or jet.

This application is filed as a continuation in part of my application entitled "Improved Combination Valve and Jet," filed March 6, 1956, Serial Number 569,726.

Valves, as a general rule, are usually limited in function and will serve but one purpose. For example, a shut-off valve or stop-cock is not ordinarily adapted to be used for throttling and vice versa, or, for example, a syphon or jet valve is not ordinarily adapted to be used for any other purpose. For the most part, a valve is designed for a given purpose and is not adapted to be used in different manners for different purposes.

It is a general object of this invention to provide a valve that is adapted for multiple uses. That is, the valve that I provide handles fluids in different ways depending upon the manner in which the valve is hooked up or used, but all without changing the basic structure of the valve.

An object of this invention is to provide a multi-purpose valve that operates as a simple and effective shut-off valve. The valve acts to selectively stop flow between a plurality of fluid connections as circumstances require.

It is an object of this invention to provide a multi-purpose valve that operates effectively as a throttling valve. The valve acts to gradually increase or decrease flow of fluid between a fully open and fully closed position.

Another object of this invention is to provide a multi-purpose valve that operates as a syphon or jet in order to induce the flow of fluid in a conduit or duct.

It is another object of this invention to provide a multi-purpose valve that operates to individually control the flow of fluid through separate channels. The valve involves two separate flow passages which may be in communication with each other or sealed off from each other, and each passage has an inlet and an outlet fluid connection.

It is also an object of this invention to provide a multi-purpose valve of the character thus far referred to that facilitates flushing or swabbing of one of the said flow passages. With the valve that I provide, one of said flow passages is isolated or sealed off from the other so that one of said passages can be opened to atmosphere for the purpose of cleaning etc.

It is still another object of this invention to provide a valve of the character above referred to that provides for cushioning of the valve element so that hammering is substantially eliminated as the valve operates to a closed position.

It is also another object of this invention to provide a valve with a movable valve element that simultaneously functions to close two separate fluid handling passages. With the valve that I provide the movable valve element has sealing engagement with a valve seat and simultaneously packs off the valve chamber to the end that both of said fluid handling passages are closed.

An object of this invention is to provide a valve adapted to serve the above-mentioned purposes and which is relatively simple and practical and inexpensive of manufacture.

The various objects and features of my invention will be fully understood from the following detailed description of the typical preferred forms and applications of my invention, throughout which description reference is made to accompanying drawings, in which:

Fig. 1 is a vertical sectional view of the multi-purpose valve of the present invention showing four separate fluid connections joined thereto and showing the valve element partially opened to act as a jet. Fig. 2 is an enlarged sectional view of a portion of the valve and showing the valve element closed in order to shut-off flow through the valve. Fig. 3 is a sectional view taken as indicated by line 3—3 in Fig. 2. Figs. 4 and 5 are enlarged detailed sectional views of portions of the valve and showing the fluid seals that I provide. Fig. 6 is a view of the valve, similar to Fig. 1, and showing the valve in use as a syphon or jet. Fig. 7 is a view similar to Fig. 2 and showing a modified form of valve element that I employ. Fig. 8 is a sectional view taken as indicated by line 8—8 on Fig. 7, and Fig. 9 is a view of the valve showing the manner of plugging the unused connections thereof.

The valve of the present invention is a multi-purpose valve intended for a wide variety of uses. It may be used as a shut-off valve, or as a throttling valve, or as a syphoning valve. Further, the instant valve may be used to advantage to control the flow of fluids through two separate flow lines 10 and 11, and is such as to facilitate flushing of at least one of said lines. As illustrated in Fig. 1 of the drawings, the valve that I provide involves, generally, a body A, a valve seat B carried in the body, a valve element C shiftably carried in the body and adapted to cooperate with the seat, means D sealing and cushioning operation of the valve element when it is closed, means E sealing between the valve element and body, means F carried over the valve element and adapted to pack off the valve chamber between the valve element and body, and lock means G for positioning the valve element C relative to the body A and seat B.

The valve body A is preferably a vertically disposed element having a central axis. A bore 12 extends through the body A to open at the top and bottom ends thereof, there being a coupling portion 13 at the bottom end of the body to join with the line 10. One or more lateral openings 14 are provided in the body A to intersect the bore 12, preferably a pair of diametrically opposite openings 14 on a common axis normal to and intersecting the axis of the bore 12. A chamber 15 is formed where the bore 12 and openings 14 intersect, the chamber 15 being enlarged by providing a counterbore 16 that enters the body A from the upper end thereof. The counterbore 16 provides access to the chamber 15 for installation of the valve seat B and slidably carries the valve element C so that it moves longitudinally of the body A. As shown, the counterbore 16 presents a smooth cylindrical wall that extends downwardly to terminate at the seat B, later described. The upper end portion 17 of the counterbore is threaded in order to receive the valve element C.

The valve seat B is removably carried in the body A and is an upwardly faced seat supported in the body where the bores 12 and 16 join, and at or near the lower sides of the openings 14, or at the lower part of the chamber 15. The seat B is a ring-shaped element with an inner diameter 18 corresponding with the diameter of the bore 12, and with a threaded outer diameter 19 engaged in a threaded socket 20 in the body A. The seat B is characterized by a flat upwardly disposed face 21 normal to the central axis, and by a tapered face 22 that extends downwardly and inwardly from the face 21 to the inner diameter 18. For example, the face 22 may be at 60° relative to the face 21. As best shown in Fig. 2, the body A is provided with a flat face 21' that forms a continuation of the face 21 and which is coextensive with the bottom of the chamber 15 and joins the walls of the counterbore 16.

The valve element C is a shiftable element slidably carried in the counterbore 16, and is characterized by a tubular body having cylindrical inner and outer walls 25 and 26. The outer wall 26 slidably engages in the counterbore 16 while the inner wall 25 aligns with and forms a continuation of the bore 12 in the body A. The inner wall 25 forms a passage 27 through the valve element C that opens at the top and bottom ends thereof, the upper end of the element C being threaded at 28 in order to join with a suitable fitting, such as for example, a fluid handling line, or a plug, or a vent cap, as circumstances require.

The lower terminal end 30 of the valve element C is tapered to match with the face 22, above described, and extends upwardly and outwardly from the inner wall 25. In practice, there is a sharp annular edge 31 at the lowermost tip of the valve element, and there is a flat downwardly disposed shoulder 32 adapted to have flat seating engagement with the face 21 when the valve element C closes with the seat B.

In the preferred form of the invention the lower end portion of the valve element C, that enters the chamber 15, is of reduced diameter, that is, it is of less diameter than the counterbore 16, leaving an annular space between the valve element C and wall of the chamber when the valve is in a down position. As shown, the intermediate portion of the valve element C is provided with a threaded nut 33 that engages in the threaded upper end portion 17 of the body A. It will be apparent that turning of the element C relative to the body A will cause raising or lowering of the element C, as desired.

The means D sealing and cushioning closing of the valve element C with the seat B is preferably carried by the seat element B of the valve structure, although said means can be carried by the valve element C or by the body A if desired. As illustrated in Figs. 2 and 4 of the drawings, the means D is a compressible annular ring 35 that is carried in an annular channel 34 in the body of the seat B to project somewhat from the face 22 thereof. The ring 35 has a flat face 36 normal to the axis of the valve body and which is adapted to have flat engagement with the shoulder 32 on the valve element C. The ring may be square in cross section and is provided with an outwardly turned lip 37 that faces radially to have sealing engagement with the shoulder (see Fig. 4). The ring 35 is recessed at 38 in order to allow for compression thereof to the end that the shoulder 32 and face 22 may come together with the ring 35 confined within the channel 34. It will be apparent how the ring 35, formed of rubber or the like, is compressed resulting in a cushioning action, and how the lip 37 forms a reliable static fluid seal.

The means E sealing between the valve element C and the body A is provided to act between the wall of the counterbore 16 and the outer wall 26 of the valve element C. Any suitable annular seal 40 may be employed, the particular seal that I have illustrated being carried in an annular groove 39 in the outer wall 26 of the valve element C (see Fig. 5). The seal 40 that I have shown has a flat outer wall having sliding engagement with the counterbore 16 and has a downwardly disposed sealing lip 41. The seal 40 is made compressible by providing a recess 42 therein and acts outwardly against the wall of the counterbore.

In accordance with the invention I have provided the means F which is adapted to pack off the valve chamber 15 between the wall of the counterbore 16 and the outer wall 26 of the valve element C. The lower end portion 45 of the valve element is turned to be of smaller diameter than the counterbore 16 establishing an annulus 46 surrounding the element (see Figs. 6, 7 and 8). The means F involves a sleeve 47 engaged over the turned portion 45, the sleeve 47 being of resilient pliant material, for example, rubber or the like. The sleeve 47 is free of the valve element C and is held in working position by means of a ring 48 that is secured to the sleeve and which locks with the valve element. In practice, the ring 48 is split and contracts into an annular recess in the element C (as shown). The upper end of the sleeve 47 is flat and engages with a step 49 on the element C while the lower end portion of the sleeve projects somewhat below the shoulder 32 of the element C. The lower end 50 of the sleeve is flat and has flat seating engagement with the face 21 and with the face 21', above referred to. Thus the sleeve 47 is compressed endwise when the valve element C is closed to the end that the sleeve 47 is expanded to fill the annulus 46. It will be apparent that the expansion of the sleeve 47 causes the sleeve to occupy the annulus 46 thus packing off the chamber 15 of the valve structure.

The valve element C is adapted to gradually open and close the openings 14 and valve chamber 15 to the bore 12 of the valve which bore is in communication with the line 10. That is, there is a throttling action depending upon the vertical positioning of the valve element C to the seat B. In order to adjust the valve, a suitable wrench or handle 52 is provided, and the upper end portion of the valve element C is polygonal to receive the handle 52 for turning engagement. In order to secure the valve element C in the desired selective position I provide the lock means G which is adapted to secure the valve element C in any selected position. The means G is very simple and involves a lock-nut 55 threadedly engaged with the threads at 17 and has locking engagement with a flat face 56 on the element C. The lock-nut is adapted to be engaged by a spanner or the like.

It will be apparent that the lock-nut 55 is effective to lock the valve in any selected position, and in order to prevent tampering with said lock-nut I have provided a cap 57. The cap 57 is threaded onto the upper end of the body A and has a closure 58 with an opening therein freely passing the upper end portion of the valve element C. By providing said cap 57 the lock-nut 55 is effectively hidden so that persons unfamiliar with the valve will not accidently disturb the setting of the element C.

In order to open the valve structure of the present invention to allow flow between line 10 and the lateral lines 11, the valve element C is raised away from the seat B a distance to gain the desired flow. It will be seen that a reliable throttling action is gained, especially when the flow is from the line 11 to the line 10 (see Figs. 1 and 6). Although the valve has two separate passages involving four fluid connections, it is to be understood that the unnecessary or unused connections may be closed as by plugs P and P' (see Fig. 9). In the later case, only one lateral line 11 is employed and one outlet line 10. If constant flow is desired between the two lateral lines 11, then the sleeve 47 of the means F is removed allowing for continued communication between said lateral lines 11 through the annulus 46 even when the valve element C is closed.

In Fig. 6 of the drawings the valve is shown in use as a syphoning valve or jet in which case the open upper end of the valve element C becomes the suction inlet and the line 10 becomes the delivery line or outlet. In this case the lateral line or lines 11 are employed to supply fluid under pressure to the chamber 15. It is to be observed that the jet orifice that is formed between the face 22 and end 30 at the seat B and element C, respectively, is a continuous annular orifice that is downwardly and inwardly disposed. Thus, the fluid delivered to the chamber 15 is directed downwardly into the bore 12 to have a syphoning action to draw fluid downwardly through the tubular valve element C.

In Figs. 7 and 8 of the drawings I have shown a modified valve element C' wherein means is provided to prevent complete stoppage of flow from the chamber 15 to the interior of the valve element C' and bore 12. The valve element C' has one or more bleed openings 60, preferably in the form of notches formed in the lower end portion of the element. It will be readily seen how continued limited flow is provided even when the valve element C' is at its lowermost position.

In Fig. 6 of the drawings I have illustrated a vented cap 65 that closes the open end of the valve element C, or C'. The vented cap 65 is preferably dome-shaped, as shown, and is provided with one or more openings 66 and a screen 67. The cap 65 may be employed when the upper end of the valve element C is open to atmosphere.

From the foregoing it will be readily understood how the valve that I have provided may be used in various ways and for the various purposes above set forth. In each instance the valve operates effectively and its action is easily determined. I provide a mark 68 on the valve element C in order to show the position thereof (see Fig. 6). Further, by simply opening the top of the valve element C the line 10 is accessible for swabbing or cleaning. As shown in Fig. 1 of the drawings a line 10' may be joined to the upper end of the valve element C and suitable rotating joints or unions (not shown) used therein to allow for rotation of said valve element.

Having described only the typical preferred forms and applications of my invention, I do not wish to be limited or restricted to the specific details therein set forth, but wish to reserve to myself any variations or modifications that may appear to those skilled in the art and fall within the scope of the following claims.

Having described my invention, I claim:

1. A valve of the character described including in combination, an elongate body with a chamber having a cylindrical wall and with a bore entering one end of the body and opening into the chamber and with a counterbore entering the other end of the body and opening into the chamber in alignment with the bore, a lateral opening in the body and entering the chamber, a valve seat carried in the body to surround the bore and facing the chamber, a tubular valve element shiftably carried in the counterbore and having a reduced end part adapted to enter the chamber and to engage with the seat and having a flow passage aligned with the bore for continuous flow therethrough and having a cylindrical outer wall in spaced relation to the wall of the cylindrical chamber, and a sleeve of resilient pliant material and carried on said reduced part and engageable between a shoulder on the valve element and the seat and expansible laterally under endwise compression to totally occupy the chamber between the outer wall of the valve element and wall of the chamber when the valve element is seated.

2. A valve of the character described including in combination, an elongate body with a chamber having a cylindrical wall and with a bore entering one end of the body and opening into the chamber and with a counterbore entering the other end of the body and opening into the chamber in alignment with the bore, a lateral opening in the body and entering the chamber, a valve seat carried in the body to surround the bore and facing the chamber, a tubular valve element shiftably carried in the counterbore and having a reduced end part adapted to enter the chamber and to engage with the seat and having a flow passage aligned with the bore for continuous flow therethrough and having a cylindrical outer wall in spaced relation to the wall of the cylindrical chamber, and a sleeve of resilient pliant material and freely carried on said reduced part and secured to a ring engaged in a channel in said reduced part, said sleeve being engageable between a shoulder on the valve element and the seat and expansible laterally under endwise compression to totally occupy the chamber between the outer wall of the valve element and wall of the chamber when the valve element is seated.

3. A valve of the character described including in combination, a body with a chamber having a cylindrical wall and with a bore entering one end of the body and opening into the chamber and with a counterbore entering the other end of the body and opening into the chamber in alignment with the bore, a plurality of lateral openings in the body and entering the side walls of the chamber, a valve seat carried in the body to surround the bore and facing the chamber, and a tubular valve element shiftably carried in the counterbore and having a reduced end part with a cylindrical outer wall in spaced relation to the wall of the cylindrical chamber and adapted to enter the chamber and to engage with the seat and having a flow passage aligned with the bore for continuous flow therethrough, and said valve element being adapted to carry a sleeve of resilient pliant material on said reduced part and that is engageable between a shoulder on the valve element and the seat and expansible laterally under endwise compression to totally occupy the chamber between the outer wall of the valve element and wall of the chamber to shut off the lateral openings from each other.

4. A valve of the character described including in combination, a body with a chamber having a cylindrical wall and with a bore entering one end of the body and opening into the chamber and with a counterbore entering the other end of the body and opening into the chamber in alignment with the bore, a plurality of lateral openings in the body and entering the side walls of the chamber, a valve seat carried in the body to surround the bore and facing the chamber, and a tubular valve element shiftably carried in the counterbore and having a reduced end part with a cylindrical outer wall in spaced relation to the wall of the cylindrical chamber and adapted to enter the chamber and to engage with the seat and having a flow passage aligned with the bore for continuous flow therethrough, and said valve element being adapted to carry a sleeve of resilient pliant material and secured to a ring engageable in a channel in said reduced part to be freely carried on said reduced part and that is engageable between a shoulder on the valve element and the seat and expansible laterally under endwise compression to totally occupy the chamber between the outer wall of the valve element and wall of the chamber to shut off the lateral openings from each other.

References Cited in the file of this patent

UNITED STATES PATENTS

| | | |
|---|---|---|
| 542,364 | Kopp | July 9, 1895 |
| 649,672 | Parson | May 15, 1900 |
| 791,548 | Fischer | June 6, 1905 |
| 894,758 | Starre | July 28, 1908 |
| 2,185,701 | Boyle | Jan. 2, 1940 |
| 2,380,714 | Winteringham | July 31, 1945 |
| 2,595,012 | Smith | Apr. 29, 1952 |
| 2,673,062 | Cornelius | Mar. 23, 1954 |
| 2,830,620 | Shuptrine | Apr. 15, 1958 |

FOREIGN PATENTS

| | | |
|---|---|---|
| 21,456 | Great Britain | Oct. 6, 1903 |
| 700,958 | France | Jan. 5, 1931 |
| 890,019 | Germany | Sept. 14, 1953 |